(12) United States Patent
Derr

(10) Patent No.: US 6,467,740 B1
(45) Date of Patent: Oct. 22, 2002

(54) CUPHOLDER FOR USE ON A BOAT

(76) Inventor: Johannes Derr, 52 Northampton La., Plainville, CT (US) 06062

( * ) Notice: Subject to any disclaimer, the term of this patent is extended or adjusted under 35 U.S.C. 154(b) by 0 days.

(21) Appl. No.: 09/817,892

(22) Filed: Mar. 27, 2001

(51) Int. Cl.$^7$ ............................................... E04G 25/00
(52) U.S. Cl. .............................. 248/200.1; 248/222.51; 248/225.21; 248/311.2; 224/406
(58) Field of Search ......................... 248/311.2, 200.1, 248/219.1, 219.2, 219.3, 222.52, 222.51, 225.21; 224/406; 211/74, 85.18

(56) References Cited

U.S. PATENT DOCUMENTS

| 1,782,701 | A | * | 11/1930 | Tuck |
| 2,514,102 | A | * | 7/1950 | Strumbos |
| D280,263 | S | * | 8/1985 | Hoye |
| 5,383,586 | A | * | 1/1995 | Levian |
| 5,557,876 | A | * | 9/1996 | Parker |
| 5,580,020 | A | * | 12/1996 | Catchings |
| 6,156,275 | A | * | 12/2000 | Dumitrescu et al. |

* cited by examiner

Primary Examiner—Korie Chan
(74) Attorney, Agent, or Firm—Robert S. Smith

(57) ABSTRACT

A cupholder for use on a boat having a pedestal guard pipe having a generally inverted U-shape with first and second mutually parallel vertical legs. The cupholder includes a first generally planar member having at least one recess defined therein that is dimensioning configured for receiving at least a first cup, a second generally planar member, and spacer means separating the first and second generally planar members and holding them in substantially mutually parallel relationship. The apparatus also includes first and second recesses on the first generally planar member dimensioned and configured for respectively engaging the first and second mutually parallel vertical legs; and first and second recesses on the second generally planar member dimensioned and configured for respectively engaging the first and second parallel vertical legs. In some forms of the invention at least one of the recesses on the first generally planar member includes at least an axial part thereof that has an axis that is disposed in oblique relationship to an upper face of the first generally planar member. Also in some forms of the invention at least one of the recesses on the second generally planar member includes at least an axial part thereof that has an axis that is disposed in oblique relationship to an upper face of the second generally planar member.

11 Claims, 5 Drawing Sheets

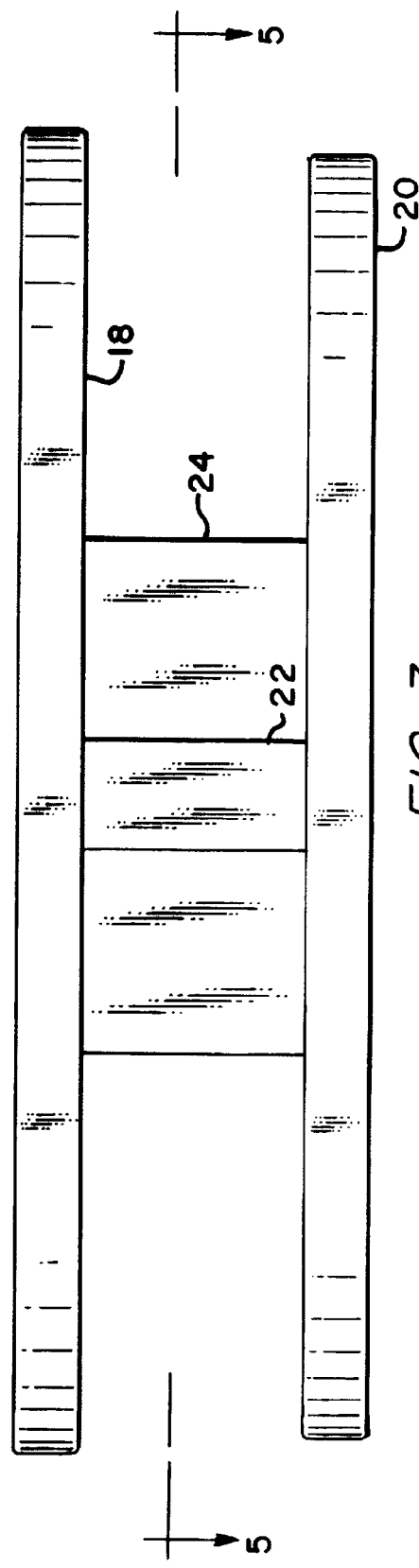
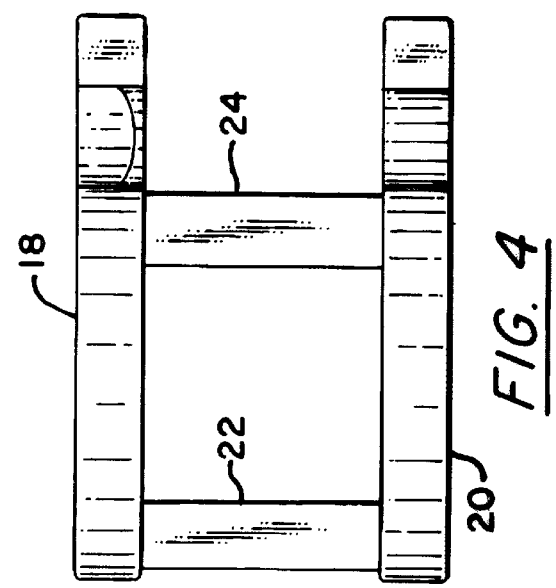
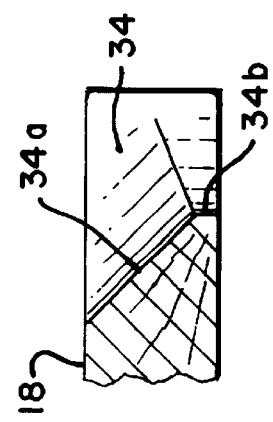
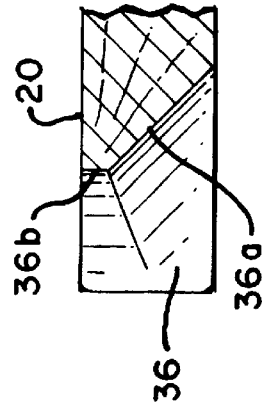

CUPHOLDER FOR USE ON A BOAT

BACKGROUND OF THE INVENTION

A cupholder for use on a boat and particularly to a cupholder that engages the pedestal guard pipe. Many boats are equipped with bulkhead steerer apparatus that includes a pedestal mounted wheel for steering the boat. This apparatus typically includes an inverted U-shaped pipe, known as the pedestal guard pipe, that is disposed adjacent to the wheel that is used for steering. Just as it is common to mount a cupholder near the driver of an automobile is also desirable to mount a cupholder near the operator of a boat.

The prior art includes various cupholder apparatus that engage the pedestal guard pipe. Typically such apparatus includes a bracket that is cantilevered from the side of the pedestal guard pipe. Such apparatus is vulnerable to being bent. In part such amending may occur because of the natural tendency for people to support themselves in rough seas and more particularly to grasp the cantilevered cupholder as the individuals seeks to maintain his or her balance in rough seas.

SUMMARY OF THE INVENTION

It is an object of the invention to provide a cupholder that will not be vulnerable to damage by occupants of the boat grasping the cupholder to maintain their balance.

Another object of the invention invention is to provide apparatus that is less vulnerable to damage and in addition to as the capacity for holding multiple cups or glasses. In Still another object invention is to provide apparatus that is aesthetically pleasing.

Yet another object invention is to provide apparatus that is easy to install an inexpensive to manufacture.

It is now been found that these and other objects of the invention may be attained in a cupholder for use on a boat having a pedestal guard pipe having a generally inverted U-shape with first and second mutually parallel vertical legs. The cupholder includes a first generally planar member having at least one recess defined therein that is dimensioning configured for receiving at least a first cup, a second generally planar member, and spacer means separating the first and second generally planar members and holding them in substantially mutually parallel relationship. The apparatus also includes first and second recesses on the first generally planar member dimensioned and configured for respectively engaging the first and second mutually parallel vertical legs; and first and second recesses on the second generally planar member dimensioned and configured for respectively engaging the first and second parallel vertical legs.

In some forms of the invention at least one of the recesses on the first generally planar member includes at least an axial part thereof that has an axis that is disposed in oblique relationship to an upper face of the first generally planar member. Also in some forms of the invention at least one of the recesses on the second generally planar member includes at least an axial part thereof that has an axis that is disposed in oblique relationship to an upper face of the second generally planar member.

The first generally planar member may include a plurality of additional recesses defined therein that are dimensioned and configured for receiving additional cups. At least one of the recess on the first generally planar member that includes at least an axial part thereof that has an axis that is disposed an oblique relationship to an upper face of the first generally planar member may be disposed an oppose relationship to the recess on the second generally planar member that includes at least an axial part thereof that has an axis that is disposed an oblique relationship to an upper face of the second generally planar member.

The first and second generally planar members may include means for allowing insertion of the cupholder into engagement with an associated pedestal guard pipe while maintaining snug engagement between the cupholder and the associated pedestal guard pipe.

BRIEF DESCRIPTION OF THE DRAWING

The invention will be better understood by reference to the accompanying drawing in which:

FIG. 3 is a front view of the cupholder apparatus illustrated and FIG. 1.

FIG. 4 is a right in view of the cupholder apparatus illustrating FIG. 1.

FIG. 6 is a sectional view taken along the line 6—6 of FIG. 5.

FIG. 7 is a sectional view taken along the line 7—7 of FIG. 2.

DESCRIPTION OF THE PREFERRED EMBODIMENT

Figure 1:
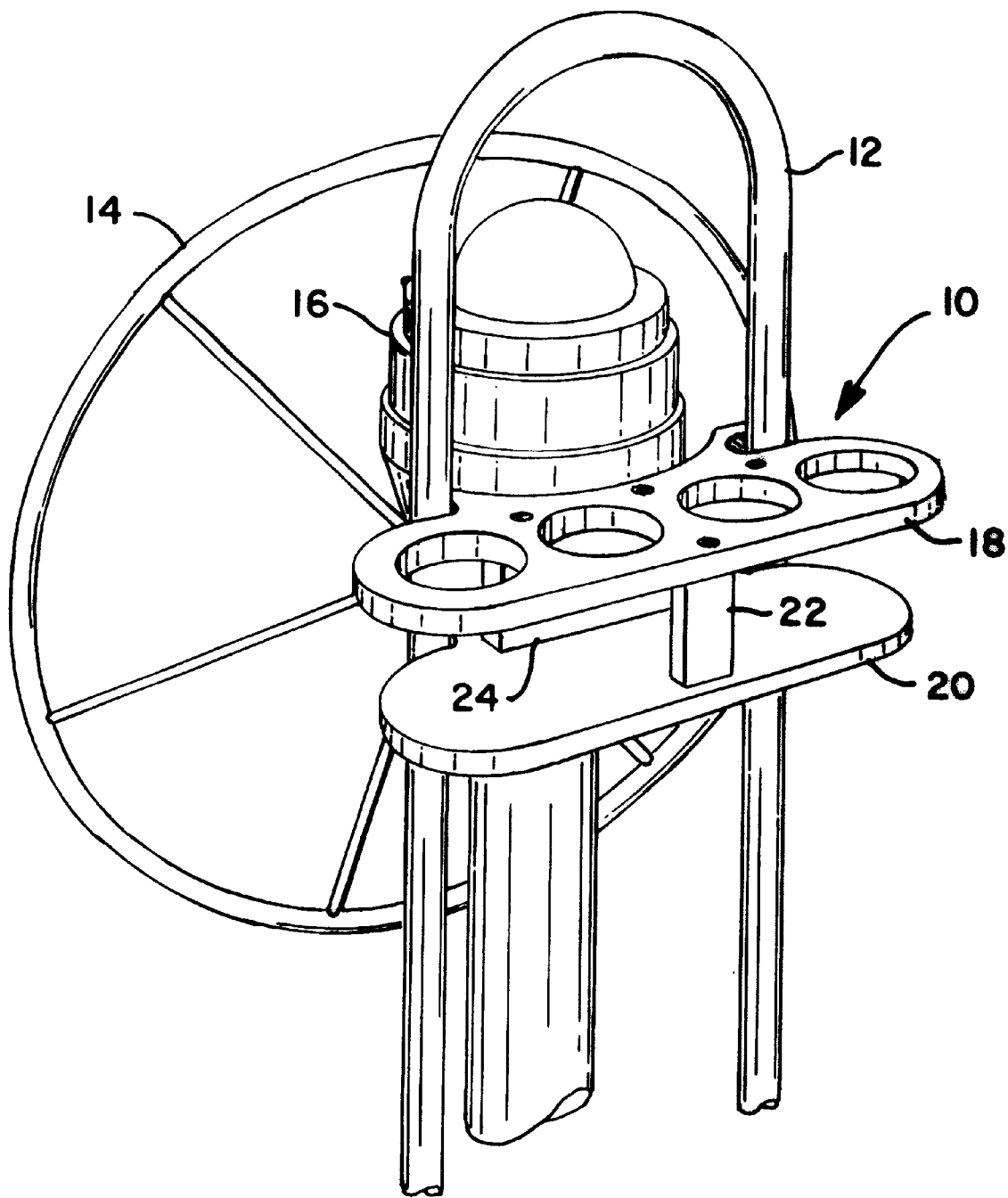
FIG. 1 is a perspective view of a wheel, part of a pedestal and a pedestal guard pipe having a cupholder in accordance with one form of the present invention mounted on the pedestal guard pipe.

Referring now to FIGS. 1–9 there is shown a preferred embodiment of the cupholder 10 in accordance with present invention. The cupholder 10 engages a pedestal guard pipe 12. Such pedestal guard pipes are widely used on a wide variety of boats the pedestal guard rail 12 protects and helps to support the pedestal 16 which carries the wheel 14. The wheel 14 is used to steer the boat on which this apparatus is mounted.

The cupholder 10 includes two planar members respectively identified as an upper planar member 18 and a lower planar member 20. The upper planar member 18 is provided with 4 holes 26 that are dimensioned and configured for receiving cups or glasses (not shown). Disposed in generally registered relationship to the holes 26 is the lower planar member 20. Accordingly when a cup is inserted into one of the holes 26 it will descend until the bottom of the cup abuts the lower planar member 20. The upper planar member 18 and the lower planar member 20 are held in spaced mutually parallel relationship by the spacers 22, 24 disposed respectively as the front and back edges of the upper planar member 18 and lower planar member 20.

Figure 2:
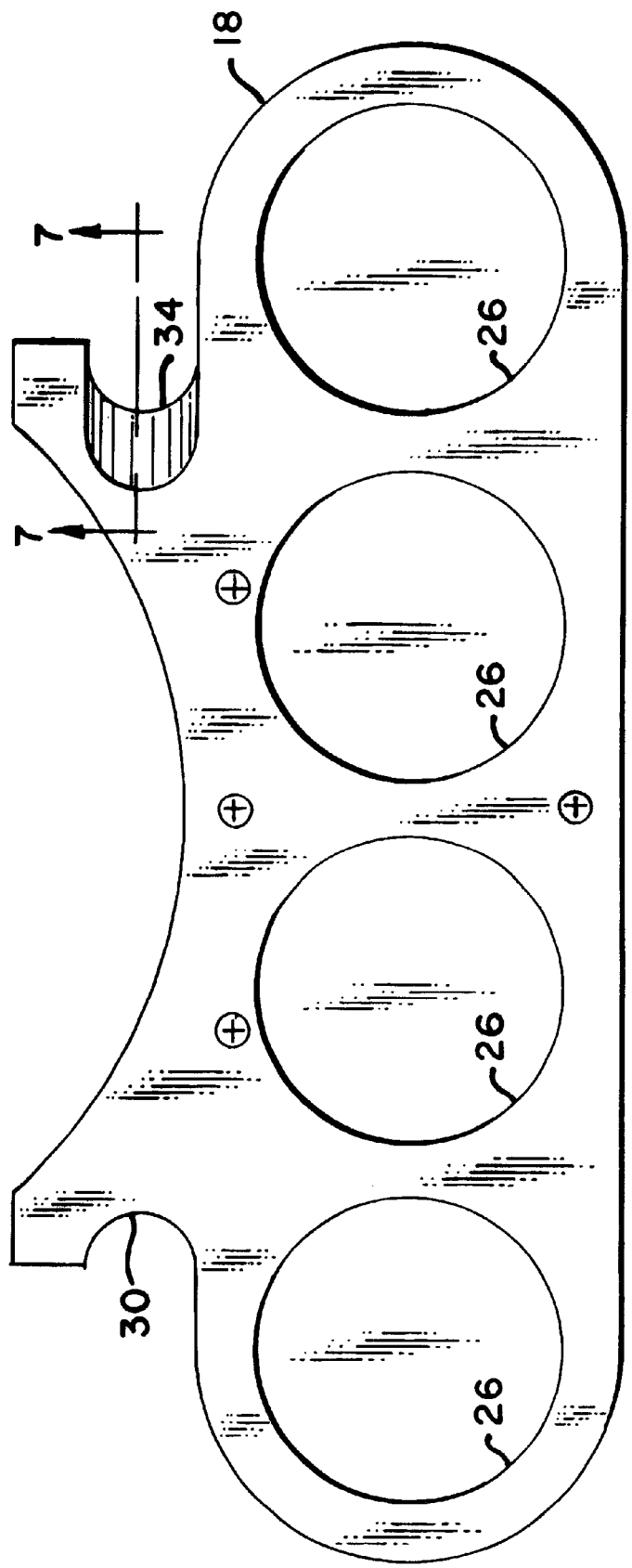
FIG. 2 is a top view of the cupholder apparatus illustrated in FIG. 1.
Figure 5:
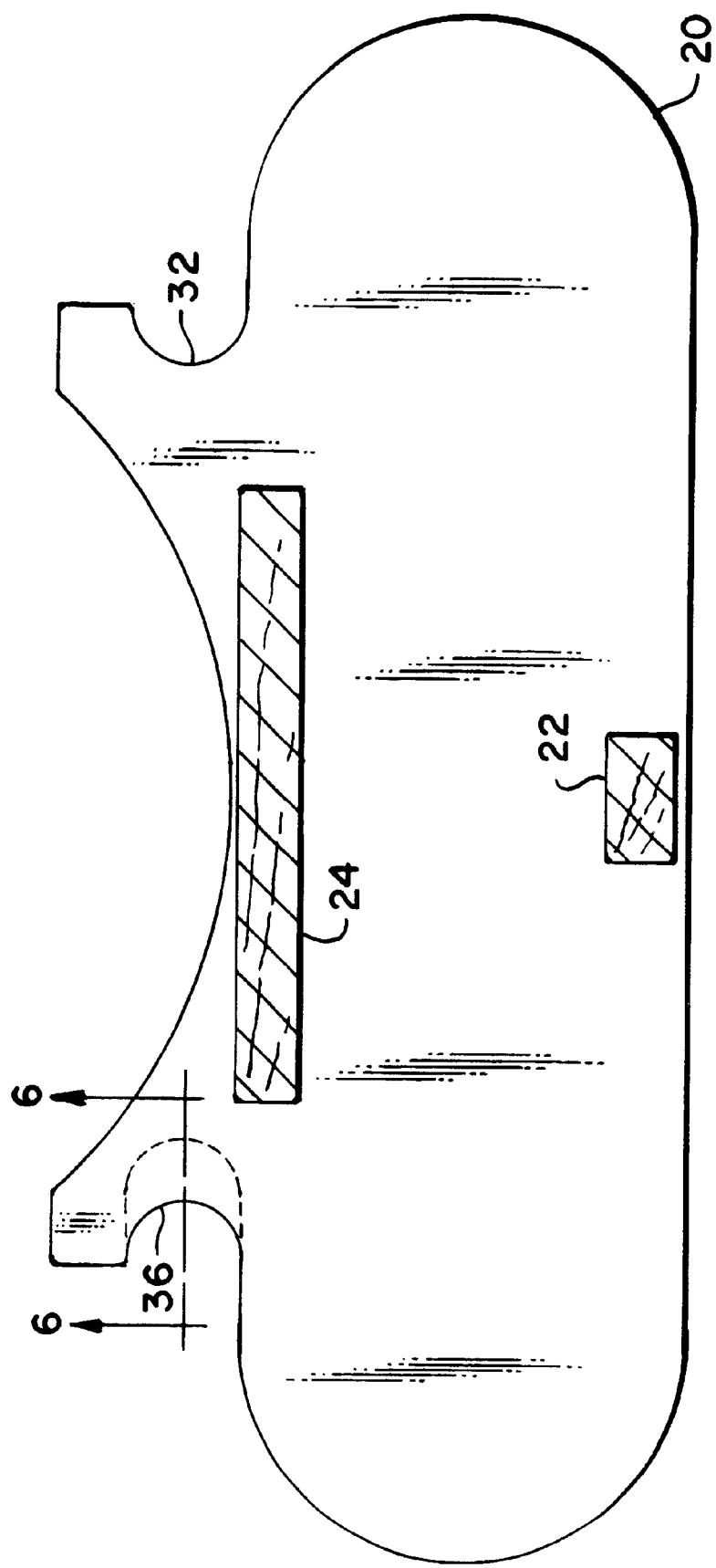
FIG. 5 is a top view of the lower shelf is line 5—5 of FIG. 3.
Figure 9:
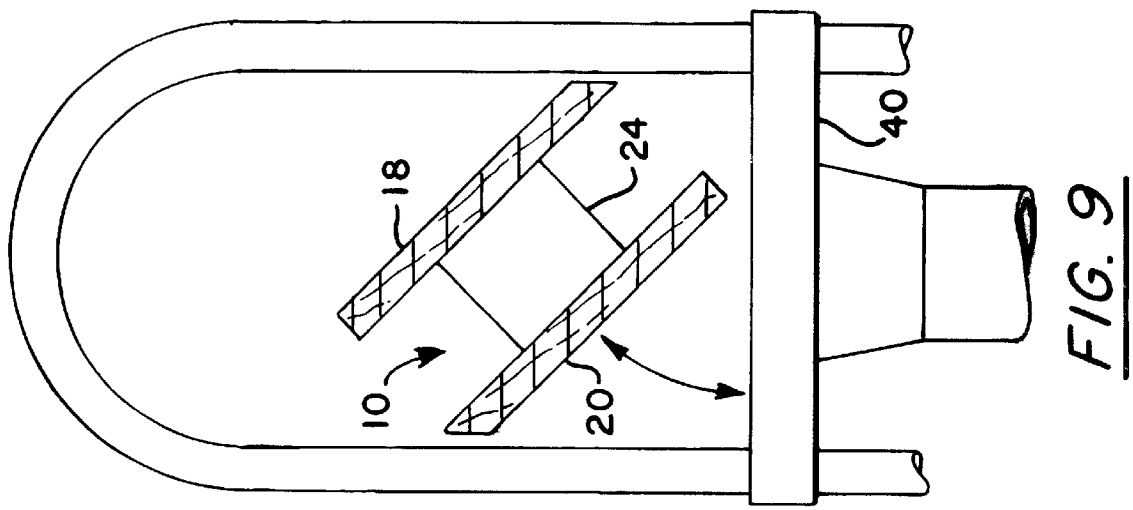
FIG. 9 is a partially schematic elevational view illustrating the cupholder in accordance with the embodiment of the present invention illustrated FIG. 1 being installed on the pedestal guard pipe.
Figure 8:
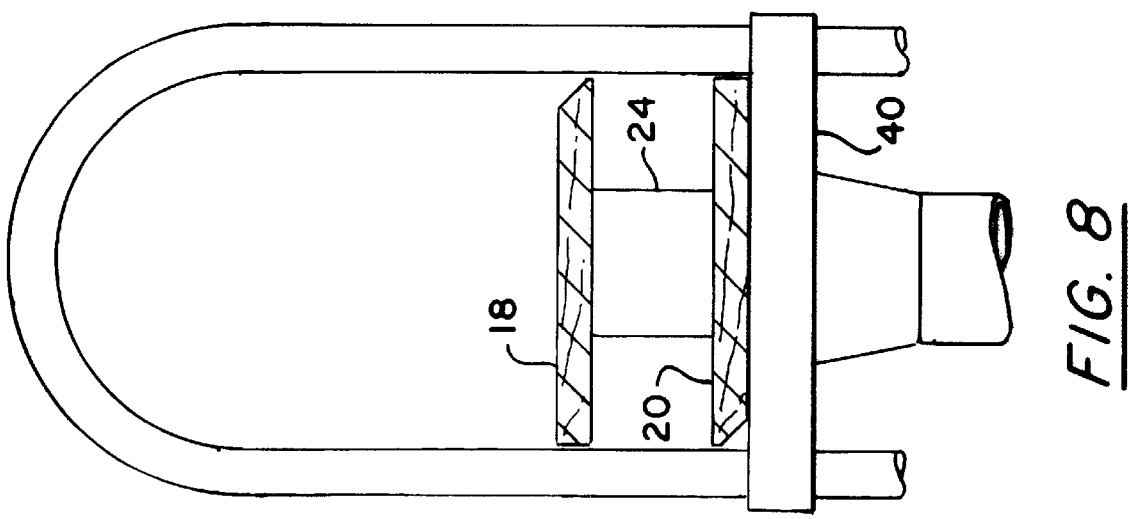
FIG. 8 is a partially schematic of elevational view illustrating the cupholder in accordance with the embodiment of the present invention illustrated FIG. 1 installed on a pedestal guard pipe.

As best seen in FIGS. 2 and 5 both the upper planar member 18 and the lower planar member 20 include recesses for engagement with the pedestal guard pipe 12. More specifically, the upper planar member 18 includes a recess 30 that is cylindrical and has an axis that is perpendicular to the plane of the upper surface of the upper planar member 18. As best seen in FIG. 2 of this recess 30 days on the left side of the preferred embodiment of the upper planar member 18. similarly the lower planar member 18 has a recess 32 on the right side thereof that is cylindrical and has an axis that is perpendicular to the plane of the lower and upper surface of the lower planar member 20. Some embodiments of the invention may use for such recesses where two on each planar member 18, 20 for engagement with the pedestal guard pipe. However, this is not the preferred structure because a mere cylindrical recess at opposed positions on each of the upper and lower planar members 18, 20 would require dimensioning that would make the cupholder and engage the pedestal guard rail 12 in a very loose manner. Stated another way, if the dimensioning of four simple cylindrical recesses was such that there was a snug engagement with the pedestal guard pipe then the only way the two could be assembled together would be to slide the lower (as view) extremities of the pedestal guard pipe through the recesses. Alternatively with such a simple structure, if the dimensioning of the recesses allowed removal and installation of the cupholder 10 on the pedestal guard pipe then the engagement would necessarily be very loose and the cupholder 10 would be vulnerable to falling off the pedestal guard pipe.

In the preferred embodiment of the present invention recesses on opposite sides of the upper planar member 18 and the lower planar member 20 are provided with an oblique orientation of a recess for engagement with the pedestal guard pipe 12. In the preferred embodiment of the recesses are contoured in the manner illustrated in FIG. 6 and 7 respectively which are cross sections taken through the line 6—6 of FIG. 5 and 7—7 of FIG. 2. In some embodiments of the invention of the axis all the recesses 34, 36 may been merely tipped with respect to a line that is perpendicular to the plane of the top surfaces of the lower planar member 20 and the upper planar member 18.

More specifically as best seen in FIGS. 6 and 7 the recesses 34, 36 are ideally generated by a generally cylindrical tool that is rotating about the axis of the cylindrical tool. The tool is moved to a position in which the axis of the tool is parallel to a part of the recess 36, identified by reference normal 36a, and the tool is moved laterally to produce the surface identified by reference numeral 36a. Thereafter the tool is moved to a position in which the axis of the tool is parallel to a part of the recess, identified by reference numeral 36b, and the tool is moved laterally to produce the surface 36b.

Similarly, the tool is moved to a position in which the axis of the tool is parallel to a part of the recess 34, identified by reference normal 34a, and the tool is moved laterally to produce the surface identified by reference numeral 34a. Then the tool is moved to a position in which the axis of the tool is parallel to the part of the recess 34, identified by reference normal 34b, and the tool is moved laterally to produce the surface identified by reference normal 34b.

It is this relief for geometric configuration that makes possible easy insertion and removal of the cupholder 10 in accordance with present invention and also makes possible a snug engagement with the pedestal guard pipe so that there is no danger of the cupholder 10 inadvertently becoming dislodged from engagement with the pedestal guard pipe. As best seen in the somewhat schematic FIGS. 8 and 9 and particularly FIG. 9 the relief on the right extremity of the upper planar member 18 and the left relief on the lower planar member, 20 permits movement of the cupholder 10 from the position shown in FIG. 9 to the position shown in FIG. 8 while still maintaining positive and engagement with the pedestal guard pipe. It will be understood that although they relief is shown on the right hand extremity of the upper planar member 18 and the left-hand extremity of the lower planar member 20 that the opposite arrangement with the relief on the left side of the upper planar member and the relief on the right side of the lower planar member 20 would also achieve the desired result, that is, that the cupholder could be easily installed and removal and yet would securely engage the pedestal guard pipe 12. A lateral member 40 is part of the structure of the boat and particularly the pedestal guard pipe. As best seen in FIGS. 89 the lateral member 40 supports the cupholder 10 when installed on the pedestal guard pipe 12.

The cupholder 10 in accordance with present invention may be manufactured of wood and teak is the preferred wood because it is more durable particularly in the environment in which boats operate. Alternatively less expensive embodiments may been manufactured out of less expensive woods and other embodiments may even be manufactured out of plastic or metal.

Those skilled in the art upon seeing the disclosure herein may recognize other variations from the preferred embodiment illustrated described herein and equivalents thereof. Accordingly, the present invention is limited only by the following claims.

What is claimed is:

1. A cupholder for use on a boat having a pedestal guard pipe having a generally inverted U-shape with first and second mutually parallel vertical legs, wherein the cupholder comprises
 a first generally planar member having at least one opening defined therein that is dimensioned and configured for receiving at least a first cup;
 a second generally planar member;
 spacer means separating said first and second generally planar members and holding them in substantially mutually parallel relationship;
 first and second opposed generally U-shaped recesses on said first generally planar member dimensioned and configured for respectively engaging the first and second mutually parallel vertical legs; and
 first and second opposed generally U-shaped recesses on said second generally planar member dimensioned and configured for respectively engaging the first and second parallel vertical legs
 wherein a wall defining one of said recesses on said first generally planar member includes a slanted surface that is disposed in oblique relationship to a horizontal upper face of said first generally planar member.

2. A cupholder in accordance with claim 1 wherein a wall of one of said recesses on said second generally planar member includes a slanted surface that is disposed in oblique relationship to a horizontal upper face of said second generally planar member.

3. A cupholder in accordance with claim 2 wherein said first generally planar member includes a plurality of additional openings defined therein that are dimensioned and configured for receiving additional cups.

4. A cupholder in accordance with claim 2 wherein
 (a) said slanted surface of one of said recesses on said first generally planar member and
 (b) said slanted surface of one of said recesses on said second generally planar member are disposed in opposed relationship.

5. A cupholder in accordance with claim 4 wherein said first generally planar member includes a plurality of additional openings defined therein that are dimensioned and configured for receiving additional cups.

6. A cupholder in accordance with claim 1 wherein said first generally planar member includes a plurality of additional openings defined therein that are dimensioned and configured for receiving additional cups.

7. A cupholder in accordance with claim 1 wherein said first generally planar member includes a plurality of additional openings defined therein that are dimensioned and configured for receiving additional cups.

8. A cupholder in accordance with claim 1 wherein said first and second generally planar members include means for allowing insertion of said cupholder into engagement with an associated pedestal guard pipe while maintaining snug engagement between said cupholder and the associated pedestal guard pipe.

9. A cupholder for use on a boat having a pedestal guard pipe having a generally inverted U-shape with first and second mutually parallel vertical legs, wherein the cupholder comprises a first elongated generally planar member having a plurality of openings defined therein that are each dimensioned and configured for receiving at least a cup;

a second elongated generally planar member;

spacer means separating said first and second generally planar members and holding them in substantially mutually parallel relationship;

first and second opposed generally U-shaped recesses on said first generally planar member dimensioned and configured for respectively engaging the first and second mutually parallel vertical legs; and first and second opposed generally U-shaped recesses on said second generally planar member dimensioned and configured for respectively engaging the first and second parallel vertical legs wherein a wall defining one of said recesses on said first generally planar member includes a slanted surface that is disposed in oblique relationship to a horizontal upper face of said first generally planar member.

10. A cupholder in accordance with claim 9 wherein a wall of one of said recesses on said second generally planar member includes a slanted surface that is disposed in oblique relationship to a horizontal upper face of said second generally planar member.

11. A cupholder in accordance with claim 10 wherein (a) said slanted surface of one of said recesses on said first generally planar member and (b) said slanted surface of one of said recesses on said second generally planar member are disposed in opposed relationship.

\* \* \* \* \*